(12) United States Patent
Nijim et al.

(10) Patent No.: US 10,390,105 B1
(45) Date of Patent: Aug. 20, 2019

(54) DYNAMIC URL INSERTION IN THE VIDEO STREAM AND COMPANION APPLICATIONS

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Eric S. Roberts, Johns Creek, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 118 days.

(21) Appl. No.: 14/031,004

(22) Filed: Sep. 18, 2013

(51) Int. Cl.
| | |
|---|---|
| *G06F 3/00* | (2006.01) |
| *G06F 13/00* | (2006.01) |
| *H04N 5/445* | (2011.01) |
| *H04N 21/81* | (2011.01) |
| *H04N 21/431* | (2011.01) |
| *H04N 21/462* | (2011.01) |
| *H04N 21/858* | (2011.01) |
| *H04N 21/8543* | (2011.01) |
| *H04N 21/4722* | (2011.01) |

(52) U.S. Cl.
CPC ..... *H04N 21/8133* (2013.01); *H04N 5/44591* (2013.01); *H04N 21/4312* (2013.01); *H04N 21/4314* (2013.01); *H04N 21/4622* (2013.01); *H04N 21/4722* (2013.01); *H04N 21/8543* (2013.01); *H04N 21/8586* (2013.01)

(58) Field of Classification Search
CPC ........... H04N 21/8586; H04N 21/8543; H04N 21/4722; H04N 21/4622; H04N 21/4314; H04N 21/4312; H04N 5/44591; H04N 21/858; H04N 21/4725
See application file for complete search history.

(56) References Cited

U.S. PATENT DOCUMENTS

| | | | |
|---|---|---|---|
| 6,668,278 B1 * | 12/2003 | Yen et al. | 709/218 |
| 2001/0001160 A1 * | 5/2001 | Shoff et al. | 725/51 |
| 2002/0120935 A1 * | 8/2002 | Huber et al. | 725/60 |

(Continued)

OTHER PUBLICATIONS

Introduction: HbbTV, 1 page (Copyright 2013).

(Continued)

*Primary Examiner* — Nasser M Goodarzi
*Assistant Examiner* — Patrick A Ryan
(74) *Attorney, Agent, or Firm* — Merchant & Gould

(57) ABSTRACT

Dynamic uniform resource locator (URL) insertion may be provided for allowing a user to view a linear video content item along with additional content in order to provide a richer and deeper viewing experience giving more control to the user during video viewing. An indication may be provided to the user indicating the availability of additional interactive content associated with the linear video in a variety of different ways, for example, display of an icon overlaid on a viewing guide user interface, a menu option, etc. Upon request, the content associated with the URL may be presented to the user in order to present the linear video content combined with the additional content in a hybrid fashion. The inserted URL may be static, or the URL may be dynamically updated based on one or more factors, such as time of day, content or action by the user or content provider.

20 Claims, 9 Drawing Sheets

(56) References Cited

U.S. PATENT DOCUMENTS

| | | | |
|---|---|---|---|
| 2003/0084456 A1* | 5/2003 | Ryan ................. | H04N 5/44591 |
| | | | 725/113 |
| 2007/0234213 A1* | 10/2007 | Krikorian ........ | H04N 21/23406 |
| | | | 715/716 |
| 2007/0294721 A1* | 12/2007 | Haeuser et al. ................ | 725/34 |
| 2008/0148336 A1* | 6/2008 | Walter ................ | H04N 21/235 |
| | | | 725/137 |
| 2010/0077428 A1* | 3/2010 | Arnold et al. .................. | 725/34 |
| 2011/0173668 A1* | 7/2011 | Rooks .................. | H04L 12/282 |
| | | | 725/80 |
| 2013/0014136 A1* | 1/2013 | Bhatia ................. | H04N 21/252 |
| | | | 725/9 |
| 2013/0312045 A1* | 11/2013 | Martin ............... | H04N 5/44513 |
| | | | 725/93 |

OTHER PUBLICATIONS

Oskar van Deventer, M. et al., "HBB-NEXT: Tailoring and Synchronising HbbTV with Multiple Second Screens," IP&TV World Forum, 20 pages (Mar. 21, 2012).

Press Release, "HbbTV Consortium Ramps up Worldwide Activity," HbbTV Consortium, 2 pages (Jun. 25, 2013).

U.S. Non-Final Office Action for U.S. Appl. No. 14/294,866 dated Aug. 25, 2015.

U.S. Appl. No. 14/294,866, filed Jun. 3, 2014 entitled "Linking Additional Content to a Being-Consumed Video Content Item".

U.S. Notice of Allowance for U.S. Appl. No. 14/294,866 dated Feb. 9, 2016.

* cited by examiner

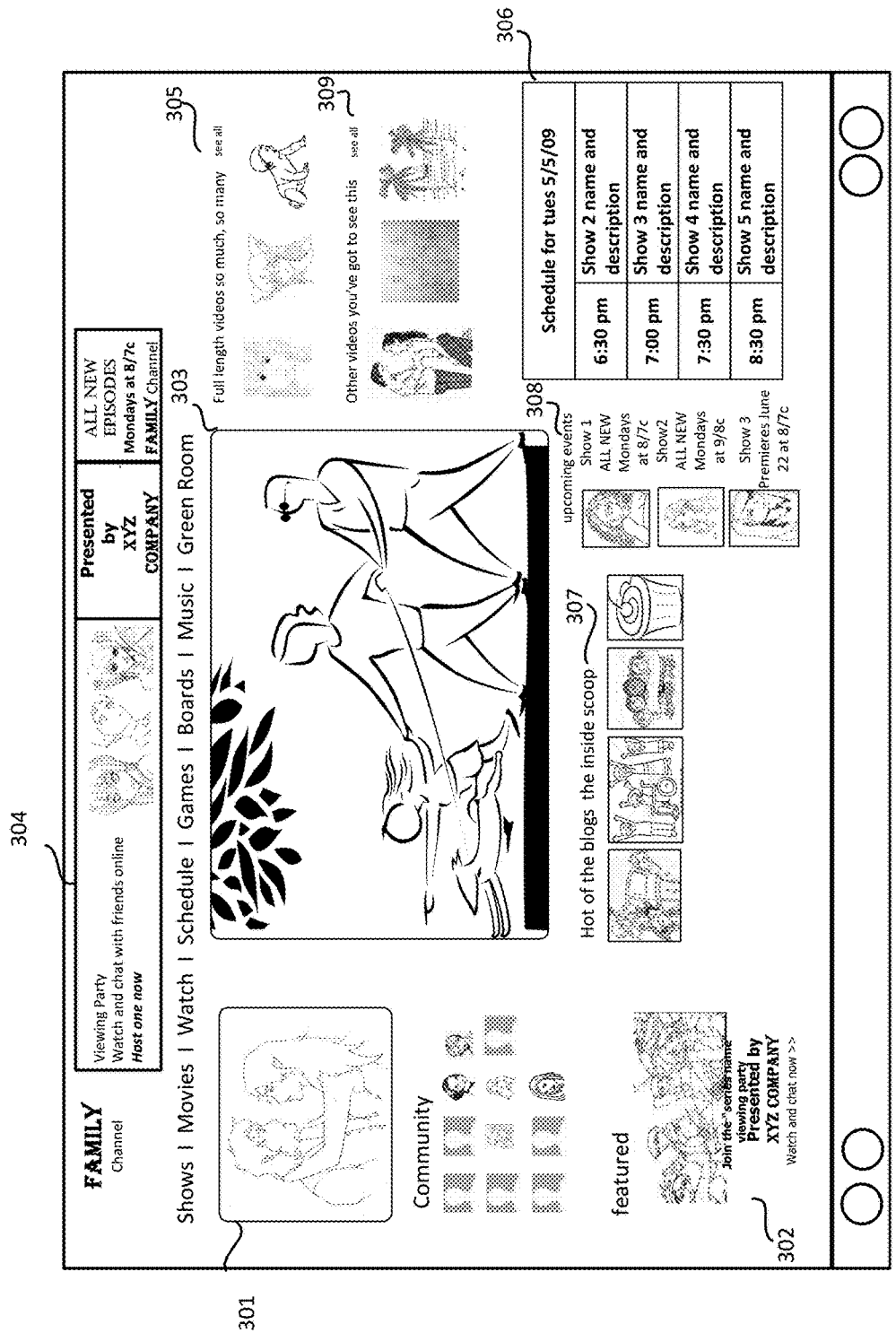

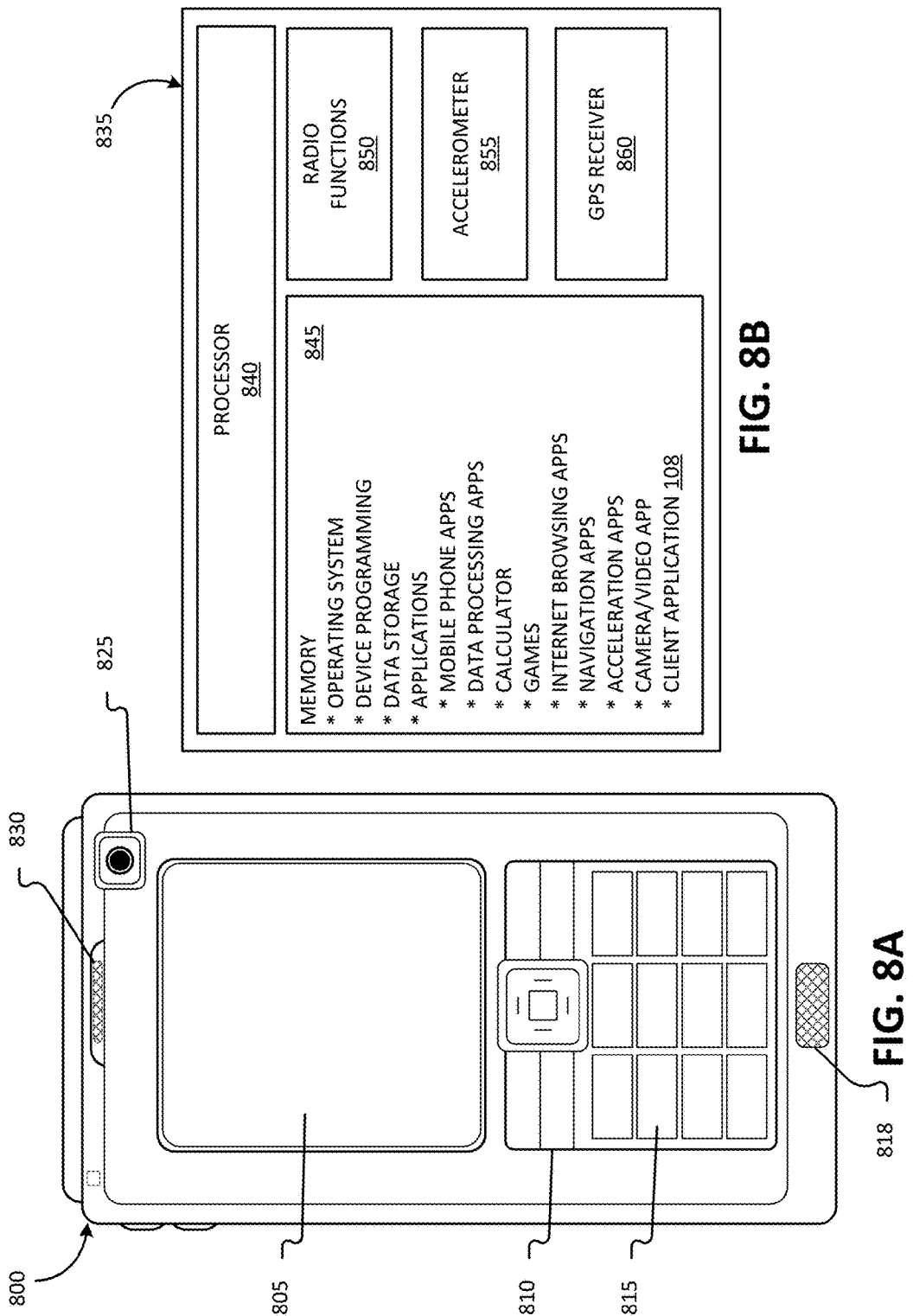

DYNAMIC URL INSERTION IN THE VIDEO STREAM AND COMPANION APPLICATIONS

BACKGROUND

Video consumers today have embraced the interactive TV system which offers a completely unique and enjoyable experience. Growing numbers of consumers choose viewing content via streaming alternatives because they like more control over the video content. In addition, the way people use devices while accessing content is also changing as "multi-screening" or the use of multiple screens simultaneously, has become a new norm. More consumers use a second device in some capacity while watching television. This media multitasking may be great for consumers, but with people dividing their attention between screens, the pressure may be increased advertisers, content creators, content providers etc., to create compelling, engaging viewing experiences that span devices and content delivery systems. Additionally, in-stream advertising holds the potential to tell advertisers when and whether viewers watched an ad, whether they followed through on embedded calls-to-action, and so forth. This may require taking a holistic approach to the content strategy, adjusting advertising to fit the consumer's multi-screen behavior, and the context of how the consumers use each device.

It is with respect to these and other considerations that the present invention has been made.

SUMMARY

Embodiments of the present invention provide for dynamic URL insertion in video streams and associated or companion applications. Dynamic uniform resource locator (URL) insertion may be provided for allowing a user to view a linear video content item along with additional content in order to provide a richer and deeper viewing experience giving more control to the user during video viewing. An indication may be provided to the user indicating the availability of additional interactive content associated with the linear video in a variety of different ways, for example, display of an icon overlaid on a viewing guide user interface, a menu option, and the like. Upon user request, the content associated with the URL may be presented to the user in order to present the linear video content combined with the additional content in a hybrid fashion. The inserted URL may be static, or the URL may be dynamically updated based on one or more factors, such as time of day, content (additional content available or video content being played), or action by the user or content provider.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 3B is an illustration of a user interface displayed on device wherein the video content is being delivered in a hybrid fashion along with the additional interactive content.

FIGS. 8A and 8B illustrate a suitable mobile computing environment with which embodiments may be practiced.

DETAILED DESCRIPTION

Figure 1:
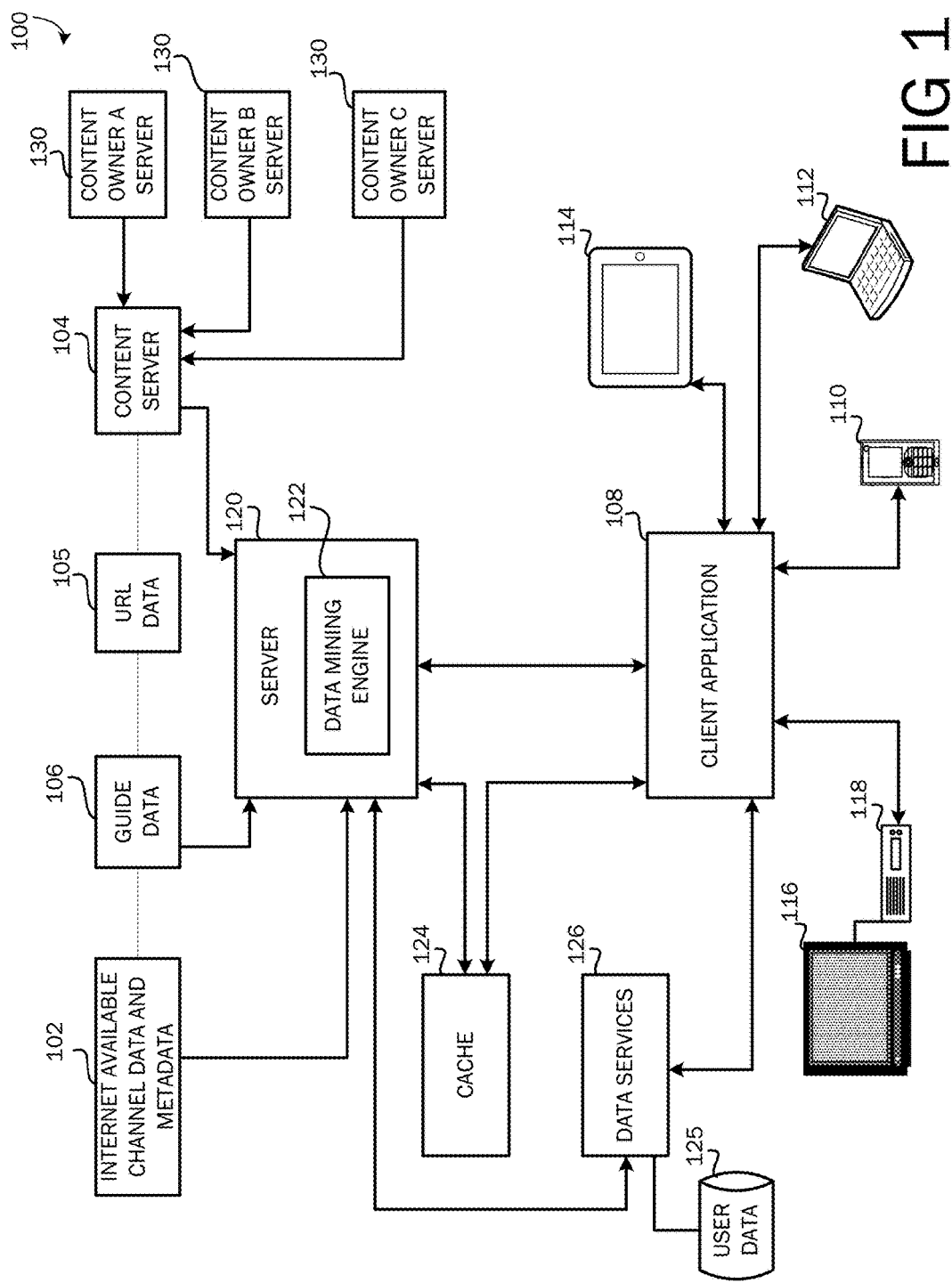
FIG. 1 is a simplified block diagram of a system for providing a dynamic URL insertion in the video stream and companion applications.

As briefly described above, embodiments provide for dynamic URL insertion in video streams and associated or companion applications. Dynamic uniform resource locator (URL) insertion may be provided for allowing a user to view a linear video content item along with additional content in order to provide a richer and deeper viewing experience giving more control to the user during video viewing. An indication may be provided to the user indicating the availability of additional interactive content associated with the linear video in a variety of different ways, for example, display of an icon overlaid on a viewing guide user interface, a menu option, and the like. Upon user request, the content associated with the URL may be presented to the user in order to present the linear video content combined with the additional content in a hybrid fashion. The inserted URL may be static, or the URL may be dynamically updated based on one or more factors, such as time of day, content (additional content available or video content being played), or action by the user or content provider. Embodiments may be utilized on various types of viewing devices including, without limitation, televisions, wired and wireless viewing devices (e.g., mobile telephones, netbooks, tablet or slate type computers, notebook computers, and laptop computers), or other hand held devices that may have browser capabilities.

According to embodiments, given the interactive experience provided by video and other content available on the Internet and other sources pressure has increased on advertisers, content creators, content providers, etc. to create compelling, engaging experiences that span devices and content delivery systems. Embodiments provide for more in-depth content to be presented on the display device in association with provided video content by providing Internet-based content associated with a "being viewed" video content item, for example, by providing information from a website of a provider of a video content item so that a user may view video content and associated website information simultaneously.

For example, if a user is viewing a television video content presentation, such as a presentation provided by CNN on the user's Internet capable television set, or computing device capable of connecting to Internet-based content there may be one or more interesting stories, news items, informational content items, and the like available at an Internet-based website (e.g., CNN.com) associated with the "being viewed" content. According to embodiments, a URL at which the additional content may be located and accessed may be inserted into the video stream, and an indication of the availability of the additional content may be made to a user of the "being viewed" content. Upon selection of an appropriate function button or control (e.g., via a remote control device, associated soft or hard keyboard, voice command, etc.), the linear video content may be blended with the content available via the inserted URL (e.g., CNN.com) so as to provide deeper, richer video viewing experience as compared to traditional video content.

A given content provider may provide the linear content items and additional content items in a variety of display configurations. Following from the above example, CNN may choose to scale their video and place it in the top left corner of a display surface, align their news stories along the right side, and their video clips along the bottom. The user may, through a functionality control interface, for example a remote control device, select a companion video clip, text-based news item, or the like to allow the user to operate within an interactive environment that CNN has provided as part of their CNN.com experience while the user is tuned to the television channel associated with the "being viewed" video content.

The video may be scaled on the viewing screen by the content owner or content provider etc. based on business agreements. According to an embodiment, the video may also be scaled due to arrangements between the user and the content owner or content provider so as to provide the user with third party content along with the "being viewed" video content if he/she wishes access to other content, for example, paid content for free or at a discounted price, etc. For example, a user may get access to a pay-per-view video at a discount or at no charge if he/she accepts to consume the video content in hybrid form where additional content (e.g. advertisements, sponsored content from third parties, and the like) is displayed in association with the video content. According to another embodiment, the content owner or the content provider may also wish to leave the video full screen and just display additional information along the bottom of the video (or other suitable location) as an example of the interactive content.

Embodiments of the present invention may be applied to any video decoding display device that can run an associated Internet browser as part of the user interface application layer. For example, devices may include, but are not limited to, a mobile communication device such as a mobile phone, a computing device, such as a desktop computer, a laptop computer, etc., a wireless computing device, such as a tablet computing device, a television, such as an Internet-connected television or a television connected to a network-connected device, such as a set top box (STB).

In many cases, a given television show or presentation is associated with an Internet-based website or web page dedicated to the show or presentation. Embodiments of the present invention bring that information to the user to provide an interactive, deeper, viewing experience upon user selection. The result may be a hybrid video viewing experience that may include a blend of traditional linear video content with Internet-based or available content and services from content providers and/or content owners, such as broadcasters, online providers and CE manufacturers including digital video recording (DVR) providers, video-on-demand (VOD) providers, interactive advertising and content personalization providers, voting system providers, games and social networking, as well as, a variety of video programming-related content and services.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram of a system 100 for providing dynamic uniform resource locator (URL) insertion in a video stream and/or companion applications for providing additional content in association with the video stream and/or companion applications as described above. Components of the system 100 may operate as a distributed system where each component is accessed via a suitable network, or the components may operate together as an integrated system. As illustrated, Internet-available channel data and metadata 102, content server 104, guide data 106 and URL data 105 may be provided. For example, Internet-available channel data and metadata 102 may include video content data and metadata available on the Internet, such as YouTube®, Hulu®, etc. Content server 104 may include video content data and metadata available via a service provider, such as cable television (CATV) services system (as illustrated and described below with reference to FIG. 6), satellite television provider, etc. The data and metadata may include information such as video content title, storyline, cast, genre, rating, release date, images, etc. Guide data 106 may include channel information, programming information, network information, etc. URL data 105 may include interactive content or pointers to the interactive content on the internet associated with the linear content provided by the content owners' A, B or C servers 130 or content providers. The association of the interactive content to the linear video may be based on time, which may be triggered at a specific point of time in the linear video, based on content (additional content available or video content being played), and/or may be based on action when the user switches to a particular video content etc.

As will be described further below, according to an embodiment, when the user selectively requests the additional interactive content, an address field may be populated in a web browser associated with of the display device, derived from the metadata, which may or may not be hidden to the user. A web query then may be performed based on the inserted website address, after which the website HTML experience may be downloaded and rendered to create a hybrid viewing experience (video and Internet content). According to an embodiment, the rendered experience may be presented according to a variety of display configurations, including scaling the "being viewed" video content in a video viewer inside the provided Internet-based content, or the linear video may be managed by the content provider based on the content provider's business agreements with content owners, CE manufacturers, third party advertisers, the user, etc.

The Internet-available channel data and metadata 102, content server 104, guide data 106, and URL data 105 may be provided to a server 120 where a data mining engine 122 may be operable to analyze and sort the data and metadata, associated URL data and metadata 105, and associate the channel data and metadata 102,104, with the guide data 106. The URL data 105 may be hidden or may be displayed to the user. The associated channel/guide data may be cached. The cache 124 is illustrated in FIG. 1 as a remote element, but may be integrated with the server 120 or the client application 108. As new information becomes available, the associated channel/guide data may be updated in the cache 124.

According to one embodiment, the cached associated channel/guide data may be specific to a user profile. The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data for associating channel and guide data to specific users.

As illustrated in FIG. 1, various endpoint devices may be utilized to access video content that can leverage HTML or web technologies to display video content with additional interactive content. For example, endpoint devices may include, but are not limited to, a mobile communication device 110, such as a mobile phone, a computing device 112, such as a desktop computer, a laptop computer, etc., a wireless computing device, such as a tablet computing device 114, a television 116, such as an Internet-connected television or a television connected to a network-connected device, such as a set top box (STB) 118. An endpoint device 110,112,114,116 may be utilized to access a client application 108.

The client application 108 may be operable to receive a request from a user for accessing associated URL data 105 and to insert an associated URL website address with a video service that can be displayed and rendered on a TV screen, in conjunction with the video service.

As illustrated and described below, an indication may be provided by the client application 108 to the user in the form of an icon in a guide display or menu option that may indicate the availability of interactive content, etc. There may also be a special button or other selectable control available on a remote control or other suitable hard or soft key selection device which may be used to request interactive content based on availability. A secondary screen companion device such as a tablet with an associated content provision application may also be used to allow the request of the interactive experience on the display screen such as the television 116. Other suitable means for interacting with and controlling available and received content includes touch command, voice command, gesture command and combinations of various functionality interface methods and systems.

Once the user requests access of the additional interactive content through any one of the above mechanisms, the linear video content being played full screen may be overlaid or replaced by the content available via associated website address (URL) that has been associated with the linear video content thus creating a web browser-type experience and providing the user with more interactive, additional information and deeper and richer content from the content owner, content provider, third party sponsor or provider, etc.

The additional content may comprise updated information feeds from a social media website associated with the being viewed video content, tailored advertisements, news items, other videos and the like that may be of interest to the user based on user preferences, third party sponsored content, and the like. The associated channel/guide data/URL data may be stored in a cache 124 located on the server 120, on the application 108, or may be located remotely and accessed via a network.

Figure 2:
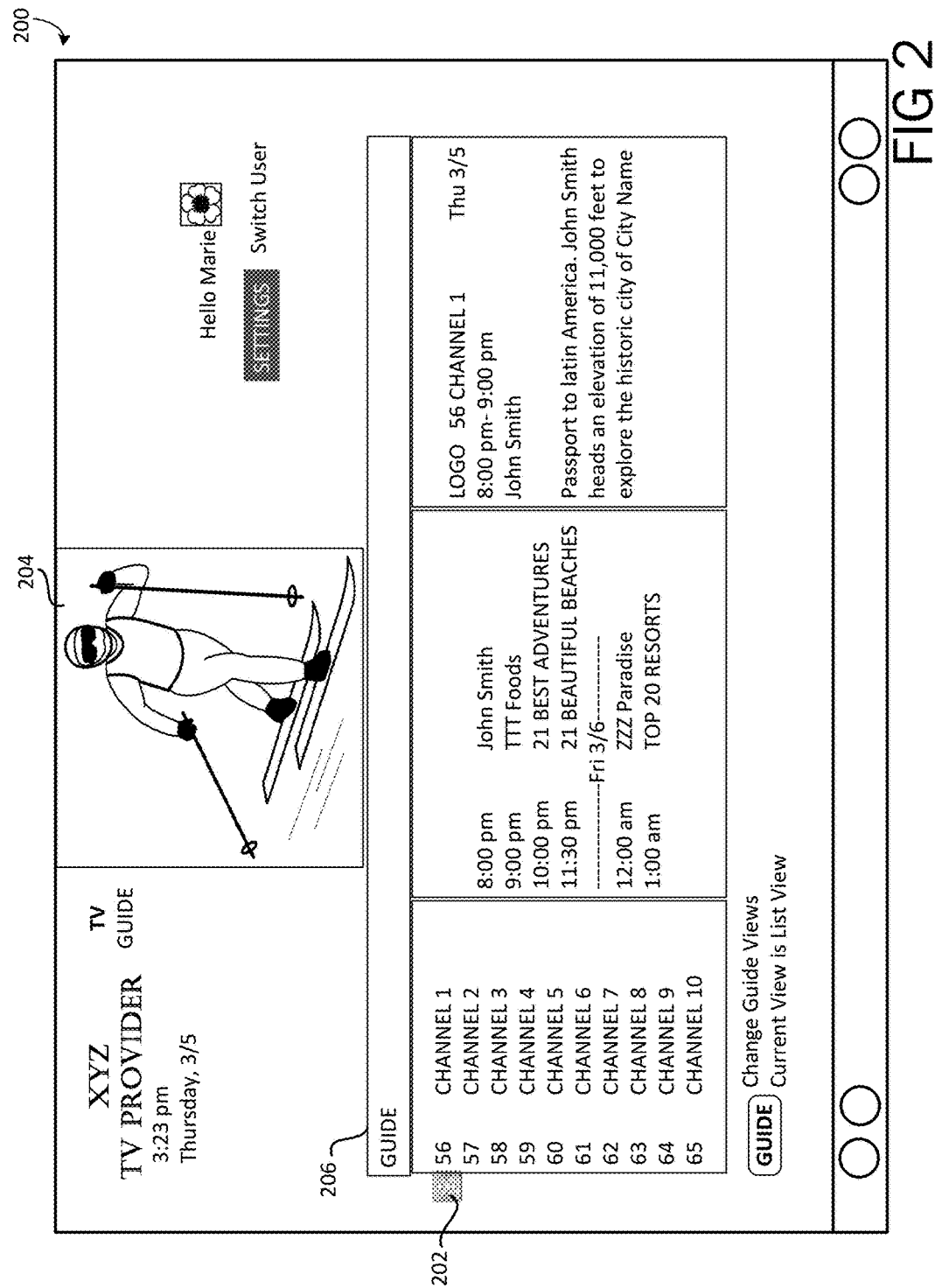
FIG. 2 is an illustration of a user interface wherein the application may indicate the availability of interactive content.

FIG. 2 illustrates a viewing guide user interface 200 with which programming information and user interaction may be provided. According to embodiments, the interactive content provided via a given URL (described herein) may be provided via the viewing guide user interface. Referring to the viewing guide user interface 200, a guide 206 is provided wherein a listing of a variety of programming choices may be presented for user information and for user selection. A video tile 204 is provided wherein a scaled video presentation may be provided simultaneous with a display of the guide 206. Other information (not numbered) may be provided in the user interface 200, for example, advertising information, content provider logos, and the like.

According to embodiments, an indicating icon 202 may appear as an overlay atop the viewing guide user interface 200 for indicating the availability of interactive content in association with one or more content items provided or available via the guide interface 200. As should be appreciated, the icon 202 is for purposes of example only and is not exhaustive of the vast number of visual indicators that may be displayed to alert users of the availability of associated interactive content. For example, such an indication may be provided via a displayed banner, mosaic tile, audio alert, text string or the like. In addition, a secondary screen companion device, such as a tablet, with an application operative for passing instructions for requesting interactive content may also be used to indicate availability of interactive content and to allow the request and initiation of the interactive experience on the display screen such as the TV 116.

According to one embodiment, the icon 202 may serve as a selectable control with which a user may request and initiate provision of interactive content in association with a URL associated with a given video content item as described above. Selection of the icon 202 may cause a display in the guide 202 if Internet-based information associated with the video that will enhance the user's consumption of the video content as described herein. Alternatively, the icon 202 may be provided in association with one of the content items listed in the guide 206 for providing Internet-based information associated with the listed content item.

As should be appreciated, the icon 202 is but one example of a selectable functionality control that may be used to request information associated with a given URL. For example, a selectable control for requesting the interactive content available via an associated URL may be provided in a menu of options, or may be provided as a designated button or key on a remote control device or on a hard or soft keyboard associated with the viewing device (e.g., TV 116). In addition, an indication icon 202 may be used to alert a user of the availability of interactive content that may be requested via other means such as voice or gesture activation.

Referring to FIG. 3, a full screen linear video display is illustrated in which video content is provided and for which a URL may be associated for providing interactive content as described herein. As with the viewing guide 200, illustrated in FIG. 2, an indicating icon 202 may be provided for indicating the availability of interactive content and one or more means (as described above) may be enabled for allowing selectable request of the associated interactive content. As described above for the viewing guide 200, an indication of available interactive content may be provided through various other means such as banners, mosaic tiles, audio alerts, text strings, or the like, or via a secondary screen companion device, such as a tablet, with an application operative for passing instructions for requesting interactive content may also be used to indicate availability of interactive content and to allow the request and initiation of the interactive experience on the display screen such as the TV 116.

Figure 3A:
FIG. 3A is an illustration of a traditional full screen linear video, displayed on a device.

Referring now to FIG. 3B, after requesting Internet-based content associated with a URL inserted in or associated with a video content item, as described above, a hybrid interactive video experience may be provided. This experience is a result of downloading the associated URL with the hybrid web experience to the video display device. As can be appreciated, the additional content may be displayed in a variety of different ways per the discretion of the content owner, content provider, etc. For example, upon choosing to experience a given additional content associated with the full screen video playing illustrated in FIG. 3A, the hybrid display of linear video combined with the interactive additional content may be presented to user as illustrated in FIG. 3B.

As should be appreciated, the hybrid interactive video experience illustrated in FIG. 3B is for purposes of example and is not exhaustive of the vast number of layouts that may be provided. That is, the display screen may be presented as an instance of a browser-type display where a variety of content items available via the associated URL may be displayed in various locations, and where the linear video 303 from which the user requested the additional interactive content may be presented in a minimized embedded player with other additional content wrapped around it. Alternatively, each additional content item may be presented in one or more mosaic-type tiles that may be disposed on a display screen while a display of the linear video is reduced accordingly. Alternatively, the hybrid content illustrated in FIG. 3B may be provided via a browser within a browser setup (one with the video content and another with the additional content).

The additional content provided via the URL may comprise any number of Internet-based content items, for example, a social website 301 for an associated television show with real-time feeds, cast profiles, messaging, etc. Other content items may include featured upcoming event information 302, various other sponsored shows previews 307, links to upcoming shows 308, program guides 306, links to other full length videos 305 and other videos 309 (based on the user profiles and tastes, third party sponsorships, etc.), as well as, advertisements 304 or other useful or helpful information. All of the additional content illustrated in FIG. 3B may be navigable based on predetermined business rules of content providers.

According to an embodiment, the associated URL may be automatically updated based on time of day, content or based on action from a user, content creator, content provider, third party content provider or sponsor, or the like. For example, if while the linear video is being presented to the user in a hybrid fashion, time for a 30 second advertisement is encountered, the URL may be updated with another URL associated with the advertisement content owner. For example, if the 30 second advertisement is related to sales of a popular automobile, then the URL may be updated to provide Internet-based content about the automobile in association with a video advertisement for the automobile. As an example of a user action causing an update of the URL, a user selection of a social media content item presented via an inserted URL may cause a dynamic updating of the URL because information available via the selected social media site may have changed since the last update of the URL. For another example, at certain times of day, for example, a time of a close of business markets, a URL may be automatically updated to reflect content changes occurring around certain times.

Further, the content provider may also update the URL based on business agreements in order to display an advertisement or other content based on a scene being shown as part of the linear video embedded in the URL. For example, if the linear video may be playing a scene in which an exotic location may be shown, the content provider may update the URL associated with the linear video such that an advertisement of an exotic location resort may be presented as illustrated in FIG. 4.

Figure 4:
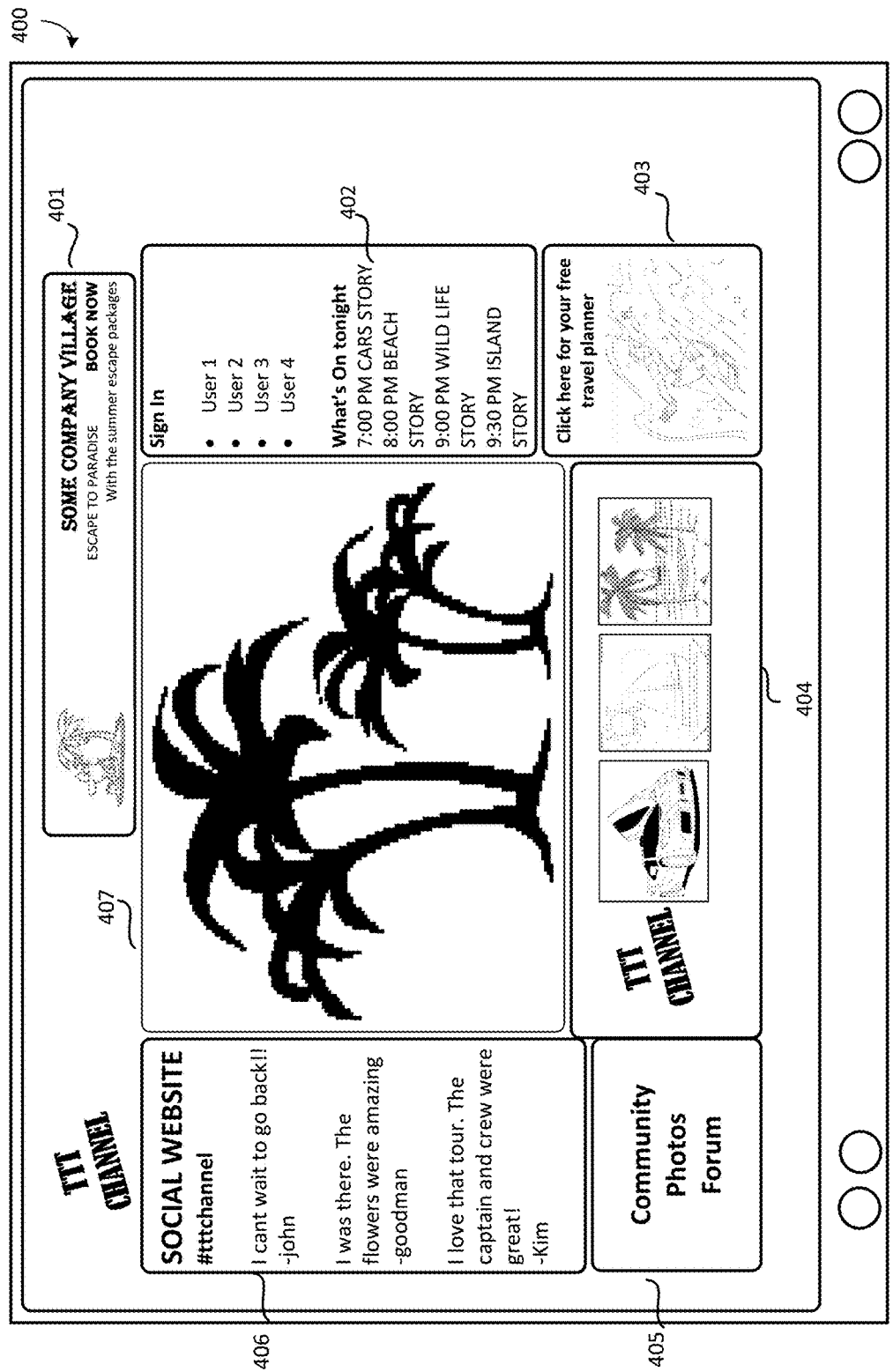
FIG. 4 is an illustration of a user interface displayed on device wherein an advertisement is being delivered in a hybrid fashion along with the additional interactive content for the ad providers.

Referring still to FIG. 4, the updated URL may have its own additional content such as the social website comments 406 of people who may have visited the example resort, community photos forum 405, other exotic locations 404 that may belong to the same content owner or may be sponsored by one or more sponsoring parties, other third party advertisements 401,403, other upcoming shows 402 information, etc. According to an embodiment, content providers may manage the additional content described herein based on various business agreements in place with the users, content owners, CE manufactures, etc.

Figure 5:
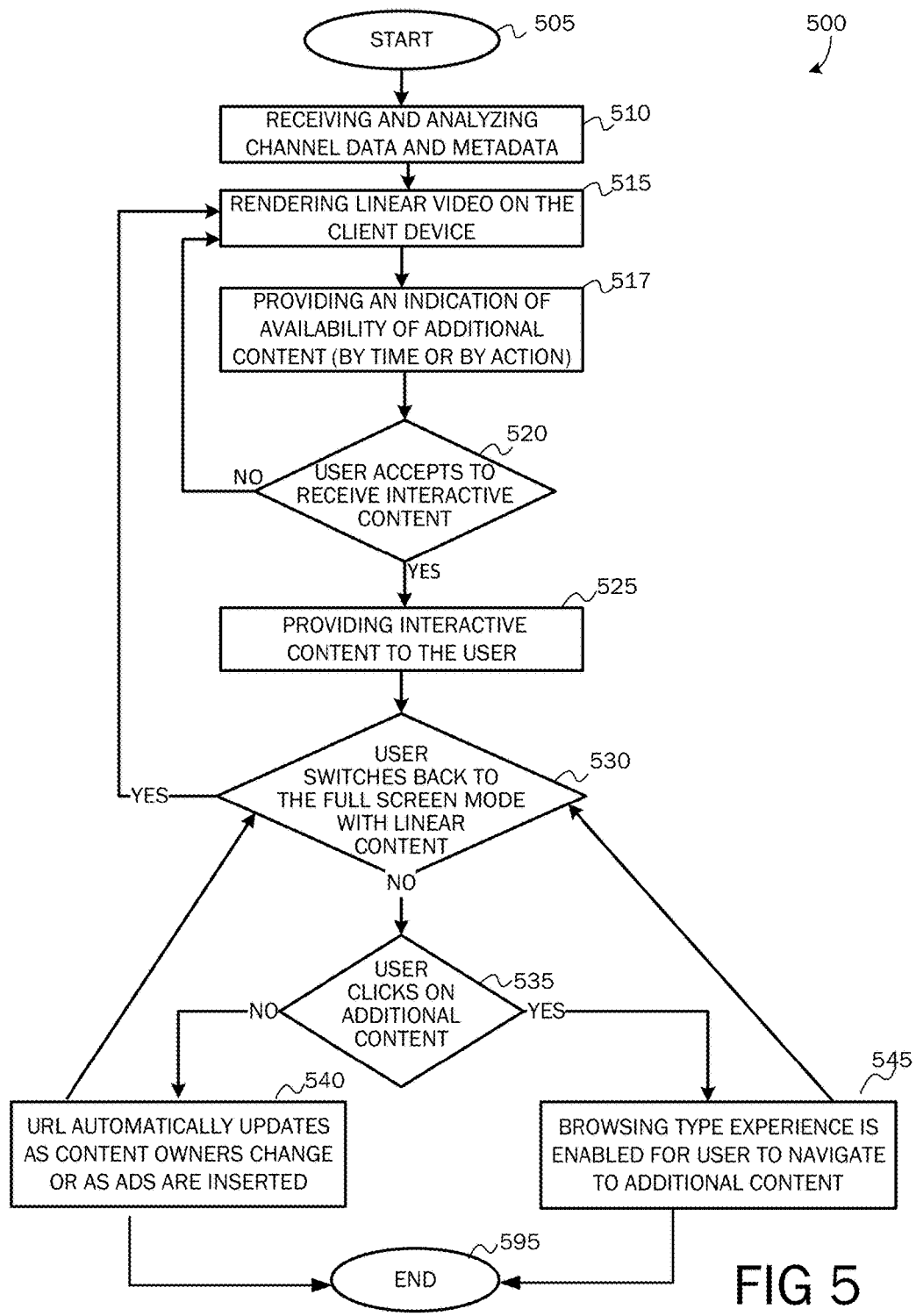
FIG. 5 is a flow chart of a method for providing a dynamic URL insertion in the video stream and companion applications.

FIG. 5 is a flow chart of a method 500 for providing dynamic URL insertion in the video stream and companion applications, according to an embodiment. The method 500 begins at OPERATION 505 and proceeds to OPERATION 510 where Internet-available channel data and metadata 102, content data (via server 104), guide data 106, and URL data 105 are received. As described above, the data and metadata 102,104,105,106 may include data and metadata about programming available via the Internet and linear programming and may include such information as information about available programs including URLs for the interactive content, program titles, storylines, cast information, genres, ratings, release dates, images, etc.

The received channel data and metadata 102,104,105 may then be analyzed and sorted and associated with the guide data 106 by the data mining engine 122. According to one embodiment, at OPERATION 510, the data mining engine 122 may query data services 126 to check entitlements, authorizations, and subscription information for a given user. The resulting associated channel/guide data may be cached. At OPERATION 515, the linear video may be rendered on the client device 110,112,114,116 by the client application 108.

The method 500 proceeds to OPERATION 517 where an indication 202 of available interactive content is provided to the user through the client application 108. The indication may be provided as an icon on the guide user interface 200 as illustrated in FIG. 2. According to another embodiment, the indication 202 may be displayed on full screen linear video as shown in FIG. 2 or may be provided as a menu option, a pop up, a mosaic, a banner and the like. The associated URL data may be stored in a cache 124 located on the server 120, on the application 108, or may be located remotely and accessed via a network.

The method 500 proceeds to DECISION OPERATION 520 where the user either accepts to receive the interactive content or not. If the user does accept to receive the additional content by requesting the interactivity, by selecting the indicator 202, the method 500 proceeds to OPERATION 525, wherein the URL associated with the linear video content is displayed on the client device, enabling the hybrid video experience (i.e. linear plus web experience). At OPERATION 525, the content data server 104 may take advantage of the fact that the request to view the additional interactive content is coming from the user who may be actively enjoying the content. When the content is requested, a viewer identifier may be sent to the content data server 104, which may include various data, including but not limited to, viewer's demographic information, taste profile, time, location, viewing history, etc.

This may enable the content in the associated URL to be dynamically updated based upon time of day, content being played, from information about a promotional event based on user's taste preferences or location, etc. Further, the associated URL that may be rendered may have various elements such as real-time feeds of a social website for a television show, various videos that may be sponsored by one or more sponsoring parties, various sponsored events, advertisements, or other content that may be presented based on the user's profile.

If the user does not accept to receive the interactive content and just decides to watch the linear full screen video display, the method 500 may proceed back to OPERATION 515 where the linear video may continue to be rendered on the client device. The method 500 may then proceed to DECISION OPERATION 530 wherein the user may or may not decide either to revert back to full screen linear video viewing experience. If the user is finished experiencing the additional interactive content and would like to revert back to full screen linear video, the method 500 proceeds back to OPERATION 515. On the other hand, if the user does not proceed back to full screen linear video viewing, at DECISION OPERATION 530, the method 500 proceeds further to another DECISION OPERATION 535 where the user may or may not decide to select additional content provided by the interactive hybrid experience.

If the user decides to select additional content provided by the interactive URL, the method 500 proceeds to OPERATION 545 where a browsing type experience may be enabled for the user to navigate through the additional content. The browsing type experience may be controlled by the content provider, content owner, etc. so that the user may not navigate away completely from the domain of the URL due to one or more business rules. According to another embodiment, the user may be allowed to experience full browsing, turning their display device from a full screen linear video mode or a hybrid linear video plus web mode to a complete web mode, wherein the user may navigate through any website or content which may not be in the domain of the content owner, content provider, third party sponsor, etc.

If the user does not select additional content provided by the interactive URL, the method 500 proceeds to OPERATION 540 where the user stays in the rich and deeper hybrid mode, watching both the linear video and the additional content. At OPERATION 540, the URL data associated with the linear video content may automatically update based on time of day, content (additional content available or video content being played), or action or as advertisements or other content items are inserted. According to an embodiment, the URL may be statically tied to a video broadcast such that whenever that viewing content (e.g., TV show) is presented, the same static URL associated with the content may be made available to the user. Alternatively, the URL may be dynamic in nature which means that it may dynamically be updated in real-time, may be redirected to a special edition webpage or may be updated during advertisement presentation boundary to provide the user with the advertiser's additional interactive content as illustrated in FIG. 4.

Consider for example that a user is watching the linear video broadcast of CNN and there is an associated URL for that content, but the user is watching the broadcast in the traditional form (i.e., no additional URL content). When the broadcast goes on a commercial break, the associated URL may be redirected to the hybrid website of the content owner of the advertisement. At that point, if the user initiates the interactive content, then the linear broadcast may automatically switch to and load the advertisement and associated hybrid web experience, and then once the commercial break is over, the display may switch back to the interactive web experience from CNN.com. The associated URL may keep updating, as the linear broadcast keeps changing, as long as the user may explicitly select to go back to viewing the linear broadcast in the traditional manner.

According to another example, the video content may switch back to its linear broadcast when the user changes the channel, and then the user may have to indicate the desire to watch the content in the interactive fashion again, for the new channel broadcast, if the interactive content exists for that channel broadcast for the current content (e.g., TV show). According to yet another example, at a given time (e.g., at top of the hour), a new or updated associated URL may be triggered and retrieved for the video content. If an updated or new URL is not available, then a static URL for that video content may be inserted by default. Embodiments may also provide for updating the associated URL in real time, so that as and/or when a new URL is associated with a linear video item, the URL is retrieved and rendered in real time to provide more updated content for the user.

The method 500 ends at OPERATION 595.

Figure 6:
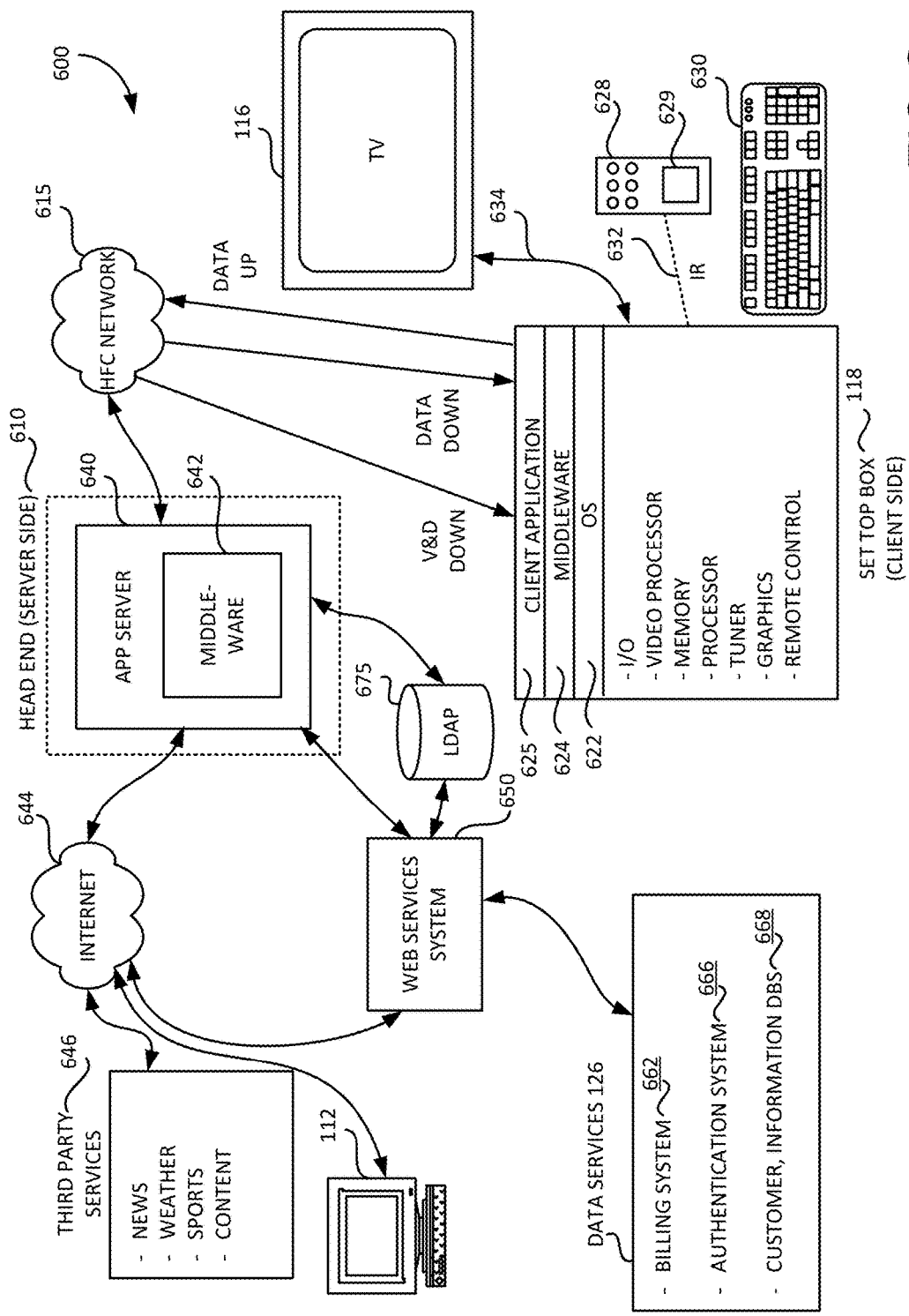
FIG. 6 is a simplified block diagram illustrating a cable television services system architecture providing an operating environment according to an embodiment.

FIG. 6 is a simplified block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing dynamic URL insertion. Referring now to FIG. 6, digital and analog video programming, information content and interactive television services are provided via a hybrid fiber coax (HFC) network 615 to a television set 116 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the client-side set-top box 118 and the server-side application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a client-side set-top box (STB) 118 functionally connected to a customer receiving device, such as the television set 116. As is understood by those skilled in the art, modern CATV systems 600 may provide a variety of services across the HFC network 615 including traditional digital and analog video programming, telephone services, high speed Internet access, video-on-demand, and information services.

On the client side of the CATV system 600, digital and analog video programming and digital and analog data are provided to the customer television set 116 via the set-top box (STB) 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628, keyboard 630, or other computing device 112, such as a tablet/slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television set 116 via a cable communication transport 634. A multi-channel tuner is provided for processing video and data to and from the STB 118 and the server-side head end system 610, described below.

The STB 118 also includes an operating system 622 for directing the functions of the STB 118 in conjunction with a variety of client applications 625. For example, if a client application 625 requires a news flash from a third-party news source to be displayed on the television 116, the operating system 622 may cause the graphics functionality and video processor of the STB 118, for example, to output the news flash to the television 116 at the direction of the client application 625 responsible for displaying news items.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications 625 and operating systems 622 that allow the client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the set-top box 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 6, between the HFC network 615 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 640 is typically passed through the "out of band" data links. Alternatively, an "in band" data carousel may be positioned in an "in band" channel into which a data feed may be processed from the server-side application server 640 through the HFC network 615 to the client-side STB 118. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs 118 for presentation to customers via televisions 116. As described above, a number of services may be provided by the CATV system 600, including digital and analog video programming, interactive television services, telephone services, video-on-demand services, targeted advertising, and provision of information content.

The application server 640 is a general-purpose computing system operative to assemble and manage data sent to and received from the client-side set-top box 118 via the HFC network 615. As described above with reference to the set-top box 118, the application server 640 includes a middleware layer 642 for processing and preparing data from the head end of the CATV system 600 for receipt and use by the client-side set-top box 118. For example, the application server 640 via the middleware layer 642 may obtain data from third-party services 646 via the Internet 644 for transmitting to a customer through the HFC network 615 and the set-top box 118. For example, content metadata a third-party content provider service may be downloaded by the application server via the Internet 644. When the application server 640 receives the downloaded content metadata, the middleware layer 642 may be utilized to format the content metadata for receipt and use by the set-top box 118. Therefore, content metadata may be sent and categorized based on the availability to the customer's program guide data.

According to one embodiment, data obtained and managed by the middleware layer 642 of the application server 640 is formatted according to the Extensible Markup Language and is passed to the set-top box 118 through the HFC network 615 where the XML-formatted data may be utilized by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 644 for provision to customers via the HFC network 615 and the set-top box 118. According to embodiments, client application 640 may include the client application 108 described herein.

According to embodiments, the application server 640 obtains customer support services data, including billing data, information on customer work order status, answers to frequently asked questions, services provider contact information, and the like from data services 126 for provision to the customer via an interactive television session. As illustrated in FIG. 6, the services provider data services 126 include a number of services operated by the services provider of the CATV system 600 which may include data on a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box identification associated with the customer. The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above.

An authentication system 666 may include information such as secure user names, subscriber profiles, subscriber IDs, and passwords utilized by customers for access to network services. As should be understood by those skilled in the art, the disparate systems 650, 662, 666, 668 may be integrated or provided in any combination of separate systems, wherein FIG. 6 shows only one example.

Figure 7:
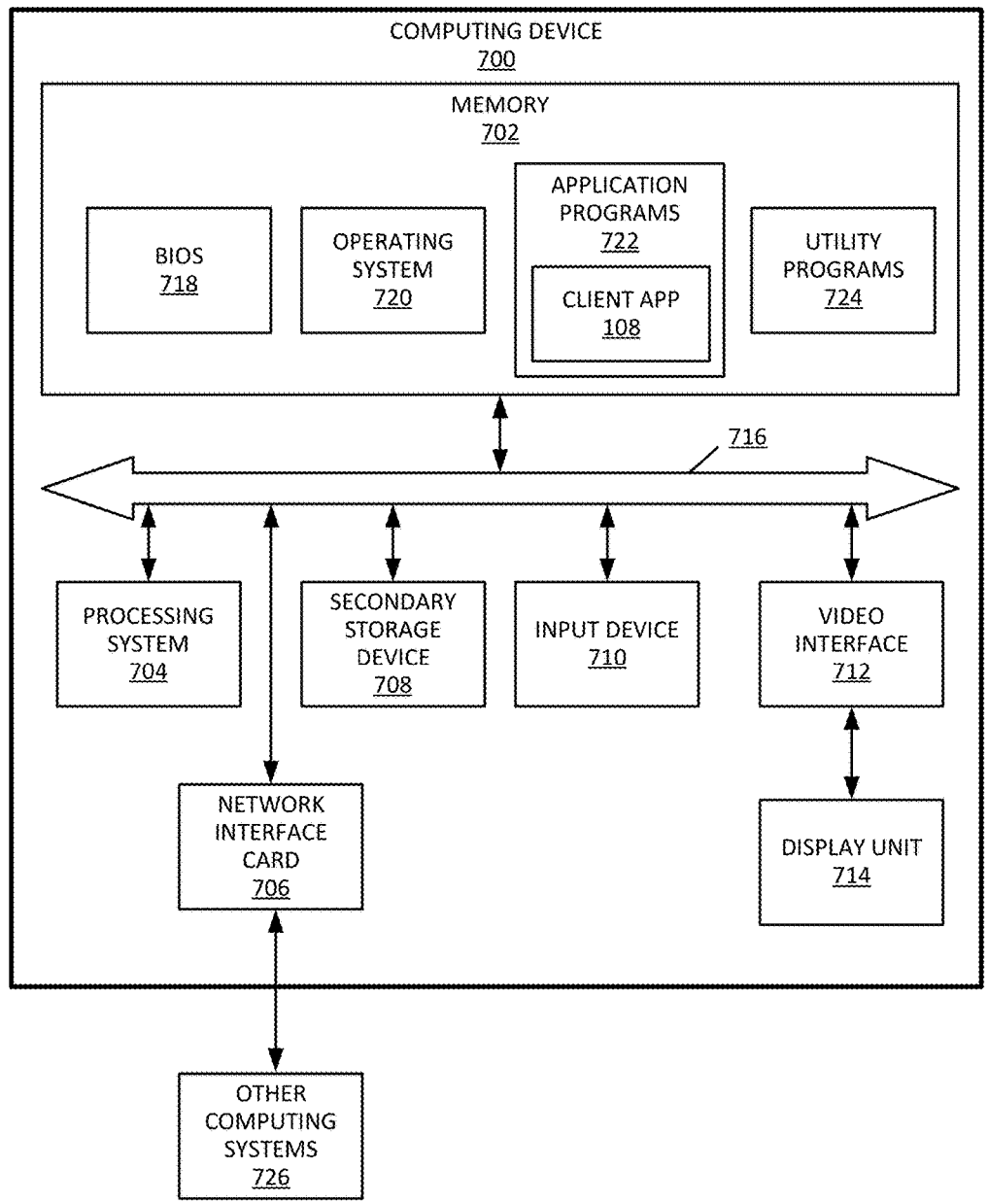
FIG. 7 is a simplified block diagram illustrating example physical components of a computing device with which embodiments may be practiced.

FIG. 7 is a simplified block diagram illustrating example physical components of a computing device 700 with which embodiments may be practiced. In some embodiments, one or a combination of the components 108,110,112,114,116, 118,120,122,124,126 of system 100 may be implemented using one or more computing devices like the computing device 700. It should be appreciated that in other embodiments, components 108, 110, 112, 114, 116, 118, 120, 122, 124, 126 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the client application 108 may be stored locally on computing device 700. Memory 702 thus may store the computer-executable instructions that, when executed by processor 704, cause the client application 108 to allow users to jump to desired channels by entering a request based information such as channel name, logo, call letter, or programs as described above with reference to FIGS. 1-6.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the client application 108. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

FIGS. 8A-B illustrate a suitable mobile computing environment, for example, a mobile computing device 110, a smart phone, a tablet personal computer 114, a laptop computer 112, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network.

Radio functions 850 may be utilized to communicate with a wireless or WIFI-based positioning system to determine a device's 800 location.

Although described herein in combination with mobile computing device 800, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method comprising:
   receiving a linear video stream comprising a video content item and metadata;
   identifying an additional interactive content item associated with the video content item, the additional interactive content item associated with an inserted URL comprising a website address of a social media website that includes updated information feeds associated with the video content item;
   enabling a display of the video content item on a viewing device;
   indicating availability to access an interactive experience that includes the video content item and the additional interactive content item comprising the social media website including the updated information feeds associated with the video content item;
   receiving a selection to enable the interactive experience that includes access to the additional interactive content item including the social media website and the updated information feeds associated with the video content item via the inserted URL, wherein the interactive experience includes displaying the video content item with the social media website including the updated information feeds associated with the video content item on the viewing device;
   populating an address field in a web browser with the website address of the social media website derived from the metadata after receiving the selection to enable the interactive experience and access the additional interactive content item;
   enabling a display of the social media website with the video content item in a hybrid format including scaling the video content item relative to a display of the social media website and the updated information feeds on the viewing device;
   providing access to additional video content at a discount or at no charge after displaying the video content item in the hybrid format with the additional interactive content item comprising the social media website and the updated information feeds associated with the video content item; and
   in response to selection of a social media content item presented with the social media website and the video content item in the hybrid format, dynamically updating the inserted URL to provide access to additional content comprising social website comments.

2. The method of claim 1, wherein dynamically updating the inserted URL is based on additional content being available for the additional interactive content item because information available via the social media website has changed since a last update of the inserted URL.

3. The method of claim 1, wherein displaying the additional interactive content item in the hybrid format is optimized for the viewing device comprising displaying the social media website with the video content item integrated therein.

4. The method of claim 1, wherein identifying the additional interactive content item associated with the video content item comprises identifying a presence of the inserted URL within the linear video stream.

5. The method of claim 1, wherein displaying the video content item on the viewing device comprises displaying the video content item on a device with browser capabilities.

6. The method of claim 1, wherein indicating availability of the additional interactive content item comprises providing an indication via an indication on a full screen linear video display by means of a menu option or icon display, or an indicative icon overlaid on a guide interface.

7. The method of claim 1, further comprising:
   continuing to provide the additional interactive content item until an indication of a selection of another interactive content item; and
   enabling a browsing experience.

8. The method of claim 7, wherein enabling the browsing experience comprises enabling browsing limited to one or more predetermined domains.

9. The method of claim 1, further comprising updating the inserted URL in response to receiving an indication of a change in linear video content or an indication of an updated URL in a server.

10. A method comprising:
    providing linear video content including an inserted URL comprising a website address of a social media website, the inserted URL enabling access to additional interactive content that comprises updated information feeds from the social media website associated with the linear video content;

indicating availability to access an interactive experience that includes the linear video content and the social media website including the updated information feeds associated with the linear video content;

receiving a selection to enable the interactive experience that includes access to the social media website and the updated information feeds associated with the linear video content via the inserted URL, wherein the interactive experience includes displaying the linear video content with the social media website including the updated information feeds associated with the linear video content on a viewing device;

populating an address field in a web browser with the website address of the social media website derived from metadata after receiving an indication of selection to enable the interactive experience and access the additional interactive content;

analyzing the additional interactive content based on a viewer identifier;

dynamically updating the additional interactive content associated with the inserted URL based on the viewer identifier;

enabling a display of the social media website with the linear video content in a hybrid format including scaling the linear video content relative to a display of the social media website and the updated information feeds on the viewing device;

providing access to additional video content at a discount or at no charge after displaying the linear video content in the hybrid format with the additional interactive content comprising the social media website and the updated information feeds associated with the linear video content; and in response to selection of a social media content item presented with the social media website and the video content item in the hybrid format, dynamically updating the inserted URL to provide access to additional content comprising social website comments.

11. The method of claim 10, wherein receiving the viewer identifier comprises receiving one or more of:
a user's taste preferences;
a user's location;
a user's demographics;
a user's viewing history; or
a user's device.

12. The method of claim 11, further comprising sending the viewer identifier to a content data server to identify information about a promotional event based on the user's taste preferences.

13. The method of claim 10, further comprising updating the additional interactive content based on one or more of:
business rules;
agreements with customers;
agreements with content owners;
upcoming events; or
sponsored events.

14. The method of claim 10, further comprising dynamically updating the additional interactive content when new additional interactive content associated with the linear video content is received.

15. The method of claim 10, wherein displaying the additional interactive content in the hybrid format is optimized for the viewing device comprising displaying the social media website with the linear video content integrated therein.

16. A system comprising:
a memory storage; and
a processing unit coupled to the memory storage, wherein the processing unit is operable to:
provide linear video content;
insert a URL into the linear video content to provide an inserted URL that comprises a website address and enables access to additional interactive content comprising updated information feeds from a social media website associated with the linear video content;
indicate availability to access an interactive experience that includes the linear video content and the social media website including the updated information feeds associated with the linear video content;
receive a viewer identifier and a selection to enable the interactive experience that includes access to the social media website and the updated information feeds associated with the linear video content via the inserted URL, wherein the interactive experience includes display of the linear video content with the social media website including the updated information feeds associated with the linear video content on a viewing device;
populate an address field in a web browser with the website address derived from metadata after receiving an indication of selection to enable the interactive experience and access the additional interactive content;
analyze the additional interactive content associated with the inserted URL based on the viewer identifier;
dynamically update the additional interactive content associated with the inserted URL based on the viewer identifier;
enable a display of the social media website with the linear video content in a hybrid format including scaling the linear video content relative to a display of the social media website and the updated information feeds on the viewing device;
provide access to additional video content at a discount or at no charge after displaying the linear video content in the hybrid format with the additional interactive content that comprises the social media website and the updated information feeds associated with the linear video content; and
in response to selection of a social media content item presented with the social media website and the video content item in the hybrid format, dynamically update the inserted URL to provide access to additional content comprising social website comments.

17. The system of claim 16, wherein to receive the viewer identifier comprises receiving one or more of:
a user's taste preferences;
a user's location;
a user's demographics;
a user's viewing history; or
a user's device.

18. The system of claim 17, further configured to send the viewer identifier to a content data server to identify information about a promotional event based on the user's taste preferences.

19. The system of claim 16, further configured to update the additional interactive content based on one or more of:
business rules;
agreements with customers;
agreements with content owners;
upcoming events; or
sponsored events.

20. The system of claim 16, further configured to dynamically update the additional interactive content when new additional interactive content associated with the linear video content is received.

\* \* \* \* \*